Jan. 14, 1930.  O. M. KIRLIN  1,743,922
CLAMP
Filed March 23, 1928
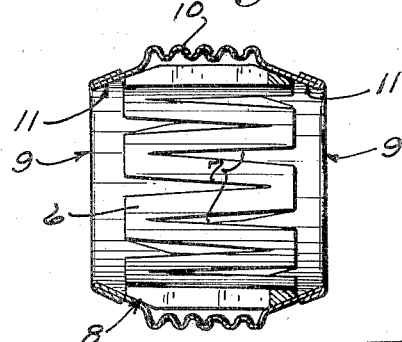
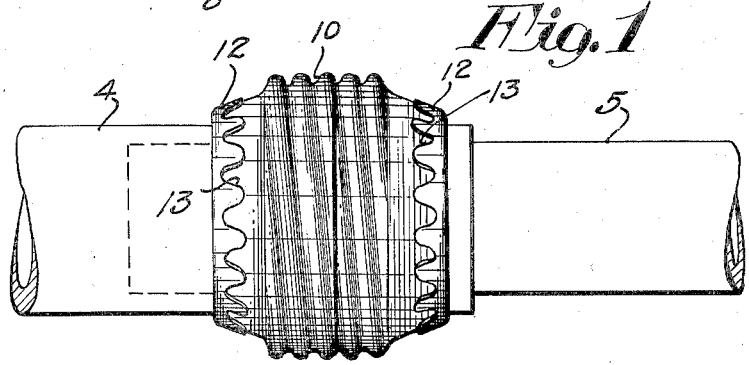
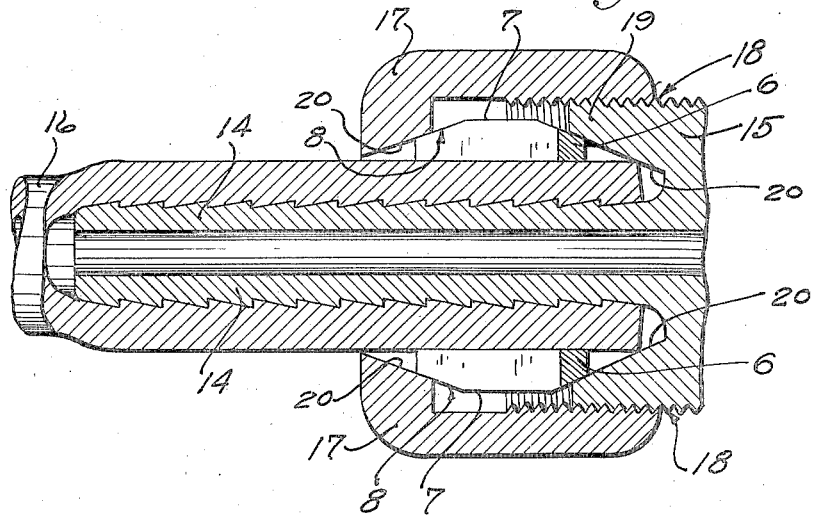
Inventor
Otis M. Kirlin
By his Attorneys
Merchant and Kilgore Patented Jan. 14, 1930

1,743,922

UNITED STATES PATENT OFFICE

OTIS M. KIRLIN, OF WATERTOWN, SOUTH DAKOTA

CLAMP

Application filed March 23, 1928. Serial No. 264,267.

My present invention has for its object to provide an extremely simple and highly efficient clamp intended for general use in connecting tubular members, but especially well adapted for use in securing a hose section to a metallic coupling tube member telescoped therein such as used in connecting two hose sections or in securing a nozzle or an air chuck to a hose.

To the above end, generally stated, the invention consists of the novel devices and combinations of devices hereinafter described and defined in the claim.

In the accompanying drawings, which illustrate the invention, like characters indicate like parts throughout the several views.

Referring to the drawings:

Fig. 1 is a view in side elevation showing one form of the improved clamp applied to a hose section and clamping the same onto a metallic coupling tube;

Fig. 2 is a view of the clamp shown in Fig. 1 in longitudinal central section; and Fig. 3 is a view principally in longitudinal central section showing the invention embodied in a chuck for attaching an air hose thereto.

Referring first to the invention as shown in Figs. 1 and 2, the numeral 4 indicates a section of a hose into which one end of a metallic coupling tube 5 is telescoped. This clamp shown in Figs. 1 and 2 shows a compression ring 6 having a multiplicity of circumferentially spaced kerfs 7 which extend transversely into said ring alternately from each end thereof. The end portions of the ring 6 are externally and reversely beveled to form a cam surface 8. Said ring 6 is made from a metal ductile enough to stand slight bending at the inner ends of the kerfs 7 to permit the ring 6 to be compressed and circumferentially contracted. This compression ring 6 is telescoped onto the end portion of the hose 4 into which the coupling tube 5 is telescoped.

Surrounding the compression ring 6 is a sleeve 9 comprising two sections connected by screw threads 10. Each section of the sleeve 9 is formed from a single piece of sheet steel and the screw thread 10 thereon is pressed from said section. The outer end portions of the sleeve 9 are outwardly and reversely contracted to afford internal cam surfaces 11 that engage the cam surfaces 8 on the ring 6 to compress and circumferentially contract the same by screwing the two sections of said sleeve together. In forming the sections of the sleeve 9 the outer end portions thereof are folded outward and inward upon themselves to afford reinforcing bands 12 that surround the internal cam surfaces 11. The inner edge portions of the bands 12 are scalloped or fluted at 13 to form grips for the hands when holding the sections of the sleeves 9 to screw the same together or when unscrewing the same.

From the above description it is evident that by screwing the two sections of the sleeve 9 together, the cam surfaces 11 will move axially onto the cam surfaces 8 and thereby compress the ring 6 and circumferentially contract the same onto the hose 4 to frictionally clamp the same onto the coupling tube 5 to form a continuous tight joint between said hose and coupling tube.

Referring now to the invention as shown in Fig. 3, the numeral 14 indicates the tubular stem of a chuck 15 of the type for connecting an air hose 16 leading from a compressor to the valve stem of a pneumatic tire. One end of the air hose 16 is telescoped onto the stem 14 and secured thereto by another form of the improved clamp. This clamp includes one of the compression rings 6 telescoped onto the outer end portion of the hose 16 surrounding the stem 14 and sleeve 17 surrounding said ring and having threaded engagement at 18 with the body of the chuck 15. Said body of the chuck 15 has a tubular inner end extension 19 that surrounds the adjacent end of the ring 6 and hose 16. The sleeves 17 and chuck body extension 18 have internal and reversely extended cam surfaces 20 that correspond to the cam surfaces 11 and engage the cam surfaces 8. By screwing the sleeve 17 onto the body of the chuck 15, the cam surfaces 20 by their engagement with the cam surfaces 8 will compress the ring 6 and circumferentially contract the same onto the hose 16 and frictionally clamp the same around the stem 14 to form a continuous tight joint therebetween.

What I claim is:

A hose coupling comprising an endless ring formed of ductile metal having its ends oppositely beveled and provided with alternate V-shaped slots extending inwardly in substantially overlapping relation and providing a continuous zigzagged strip, and compression means for said ring comprising a pair of cooperating threaded sheet metal sleeve members having internal beveled surfaces adapted to bear upon the beveled ends of the ring and force them inwardly, the outer ends of the cooperating sleeve members being folded back upon themselves to form reinforcing bands, said reinforcing bands having fluted edges providing gripping portions.

In testimony whereof I affix my signature.

OTIS M. KIRLIN.